(12) United States Patent
Sørensen et al.

(10) Patent No.: US 6,615,751 B1
(45) Date of Patent: Sep. 9, 2003

(54) METHOD FOR REDUCING AGGLOMERATION, SINTERING AND DEPOSIT FORMATION IN GASIFICATION AND COMBUSTION OF BIOMASS

(75) Inventors: Lasse Holst Sørensen, Roskilde (DK); Jan Fjellerup, Roskilde (DK); Ulrik Henriksen, Søborg (DK)

(73) Assignee: Raetech (DK)

(*) Notice: Subject to any disclaimer, the term of this patent is extended or adjusted under 35 U.S.C. 154(b) by 0 days.

(21) Appl. No.: 10/031,306

(22) PCT Filed: Jul. 14, 2000

(86) PCT No.: PCT/DK00/00404
§ 371 (c)(1),
(2), (4) Date: Apr. 15, 2002

(87) PCT Pub. No.: WO01/05911
PCT Pub. Date: Jan. 25, 2001

(30) Foreign Application Priority Data

Jul. 16, 1999 (DK) .............................. PCT/DK99/00409

(51) Int. Cl.$^7$ .............................. F23B 7/00; F23G 5/02; C10L 5/00
(52) U.S. Cl. ..................... 110/343; 110/342; 110/346; 44/605
(58) Field of Search ................... 44/603, 605; 110/343, 110/345, 346, 347, 342; 48/197 R, DIG. 2; 252/373

(56) References Cited

U.S. PATENT DOCUMENTS

| | | | |
|---|---|---|---|
| 3,004,836 A | | 10/1961 | Thompson |
| 3,630,696 A | | 12/1971 | Milner et al. |
| 3,907,674 A | | 9/1975 | Roberts et al. |
| 4,428,310 A | | 1/1984 | Kekish et al. |
| 4,458,095 A | | 7/1984 | Wingfield, Jr. et al. |
| 4,759,772 A | | 7/1988 | Rogers et al. |
| 5,034,114 A | * | 7/1991 | Kukin .................. 208/48 AA |
| 5,425,317 A | * | 6/1995 | Schuab et al. .............. 110/346 |
| 5,538,929 A | | 7/1996 | Sudhakar et al. |
| 5,937,772 A | * | 8/1999 | Khinkis et al. ............. 110/345 |

FOREIGN PATENT DOCUMENTS

| | | |
|---|---|---|
| CA | 1202485 | 4/1986 |
| EP | 000 52 334 A2 B1 B2 | 11/1981 |
| GB | 2 053 963 | 6/1980 |
| JP | 52042806 | 4/1977 |
| JP | 52063904 | 5/1977 |
| JP | 53136007 | 11/1978 |
| JP | 54151585 | 11/1979 |
| JP | 56070875 | 6/1981 |
| JP | 58167682 | 3/1983 |
| JP | 2258067 | 10/1990 |
| JP | 05163088 | 6/1993 |
| SE | 401 372 | 5/1978 |
| SE | 418 302 | 5/1981 |
| WO | WO 86/07602 | 12/1986 |
| WO | WO 88/10291 | 12/1988 |
| WO | WO 01/05911 | 1/2001 |
| WO | WO 01/05913 | 1/2001 |

OTHER PUBLICATIONS

Janson, J. and Jousimaa, T. (1996). Nordic Pulp and Paper Research Journal 1, 4–14.
Skrifvars V.–J., Sfiris G., Backman R., Widegren–Dafgård K., Hupa M. (1997). Ash Behavior in a CFB Boiler During Combustion of Salix, Energy & Fuels 11, 843–848.
Zevenhoven–Onderwater M., Skrifvars B.–J., Backman R., Hupa M. (1999). Nordic Workshop on Ash Chemistry, Properties and Behavior, Jun. 3–4, Gothenburg, Sweden.
Levin E.M., Robbins C.R., Mcmurdie H.F. Fifth. Printing (1985). Phase Diagrams for Ceramist, vol. I, 1964.
Roine A. HSC Chemistry® for Windows (1997). Chemical Reaction and Equilibrium Software with Extensive Thermochemical Database. User's Guide.
Barin I. (1995). Thermochemical Data of Pure Substances, Third Edition, Weinheim, Germany.
Knacke O., Kubaschewski, Hesselmann K. (1991). Thermochemical Properties of Inorganic Substances, Second Edition. Springer–Verlag Berlin, Heidelberg, Germany.
Skrifvars B.–J. (1994). Sintering Tendency of Fuel Ashes in Combustion and Gasification Conditions. Doctoral Thesis, Åbo Akademi University, Åbo/Turku, Finland.
Paul Norby. (1999). University of Oslo, Norway (personal communication) (Figures of Spectra enclosed).

* cited by examiner

Primary Examiner—Ira S. Lazarus
Assistant Examiner—K. B. Rinehart
(74) Attorney, Agent, or Firm—Brinks Hofer Gilson & Lione

(57) ABSTRACT

The present invention relates to a method for reducing agglomeration, sintering and deposit formation resulting from the gasification or combustion of a solid carbonaceous fuel material comprising a combustible portion and a non combustible inorganic portion, which non combustible inorganic portion comprises 4 to 50 parts by weight of $K_w + Na_w$, and 0 to 40 parts by weight of $Si_w$, wherein $K_w$ is potassium, $Na_w$ is sodium, and $Si_w$ is silicon, all calculated in parts by weight of the elements per 100 parts by weight of the inorganic portion, and optionally also chloride, phosphorus, calcium and sulphur which method is characterised in adding to the fuel before or during the gasification or combustion, $P_{added}$ parts by weight of phosphorus compound calculated as P wherein the amount $P_{added}$ is calculated in accordance with the formula I $$P_{added} = q1 \times (31/39\ K_w + 31/23\ Na_w - P_w - 31/35,4\ Cl_w) \quad (I)$$

wherein q1=0.33 to 5, and $P_w$ and $Cl_w$ are the amount of phosphorus and chloride, respectively, present in the fuel material before the addition calculated in parts by weight of the elements per 100 parts by weight of the inorganic portion, and if necessary $Ca_{added}$ parts by weight of calcium compound calculated as Ca wherein the amount $Ca_{added}$ is calculated in accordance with formula II $$Ca_{added} = q2 \times (40/31 \times (P_{added} + P_w) - Ca_w) \quad (II)$$

wherein q2=0–3 and $Ca_w$ is the amount of calcium present in the fuel material before the addition.

13 Claims, No Drawings

METHOD FOR REDUCING AGGLOMERATION, SINTERING AND DEPOSIT FORMATION IN GASIFICATION AND COMBUSTION OF BIOMASS

TECHNICAL FIELD

The present invention relates to a method for reducing agglomeration, sintering and deposit formation resulting from the gasification or combustion of a solid carbonaceous fuel material comprising a combustible portion and a non combustible inorganic portion, which non combustible inorganic portion comprises 4 to 50 parts by weight of $K_w + Na_w$, and 0 to 40 parts by weight of $Si_w$, wherein $K_w$ is potassium, $Na_w$ is sodium, and $Si_w$ is silicon, all calculated in parts by weight of the elements per 100 parts by weight of the inorganic portion, and optionally also chloride, phosphorus, calcium and sulphur. This type of solid carbonaceous fuel material having a substantial content of potassium and in some cases also sodium is typically met in solid fuels having a high proportion of a biomass material, such as straw.

BACKGROUND ART

For the disposal of biomass side products and for the utilisation of the energy contained in biomass materials, a number of processes are being developed for the utilisation of biomass materials as fuels. In some of the processes the biomass may be used in combination with conventional fossil fuels including solid fuels, such as coal and coke.

The ash obtained from coal or coke often contains contaminating compounds, such as heavy metals, for which reason they cannot be utilised as fertilizers. Therefore other means for the disposal is used including the use as an ingredient in cement.

Generally ash from biomass materials contains much less amounts of such contaminating compounds. These compounds, on the other hand, are not usable in cement preparation due to a higher content of alkali metal compounds, especially potassium compounds. Furthermore the presence of chlorine, especially as alkali metal chlorides or HCl, gives rise to corrosion problems in connection with combustion and gasification.

The utilisation of biomass fuels in gasification plants is often carried out in two steps. The first step is a gasification carried out under limited oxygen supply. The subsequent step is a combustion of the gases with sufficient oxygen supply, optionally together with other fuel materials. Especially the gasification step often results in problems because the ash of the biomass, which in this case is the not gasified residue, either causes bed sintering and defluidization, corrosive deposits, or corrosive alkaline filter dust formation. This is due to the low melting point and high partial pressure of certain alkali metal compounds, which form part of or are derived from the non-combustible inorganic portion of the fuel. Silicon is another element typically abundant in the fuel. Alkali compounds, in combination with silicon and possibly small amounts of calcium, can produce low temperature eutectica. Local hot spots, where the temperature may increase far beyond the set point temperature, due to char or gas burning in zones where the oxygen to fuel ratio is relatively high, will exacerbate the problem causing further sintering and adhesion of neighbouring particles, which will raise the temperature even further.

CA 1 202 485 (Kekish et al.) discloses a method of raising the fusion point of slag by the addition of 0.5 to 10.0% by weight of the slag of a phosphate compound in fuels forming slag, with a high content of silicon oxide (up to 81%) and calcium oxide. The method is exemplified with a slag having a fusion point of about 1480° C. without the addition, and a fusion point above 1540° C. with addition of monoammonium phosphate, or phosphated alumina in an amount of 5% by weight of the slag.

The content and the composition of the non combustible inorganic portion of the fuel used by Kekish is not disclosed directly. The composition of the resulting slag is exemplified with 81% by weight of silicon oxide (45.4% Si), 9% by weight of calcium oxide (6.4% Ca), and only 3% by weight of potassium oxide (2.5% K). The high fusion temperatures relevant for this composition of slag is not a concern during biomass gasification or combustion according to the present invention. Kelish reports, that slag formation can be reduced and fusion temperatures raised to 1540° C. by adding as little as 0.025–0.1% $H_3PO_4$ by weight of the solid fuel, irrespective of the fuel composition. Kekish, however, does not deal with fuel materials causing severe agglomeration, sintering, and deposit formation already in the temperature range of 700–1000° C., and especially fuels rich in potassium and with significant amounts of chloride, phosphorus, calcium and sulphur. An example of such fuel is straw, which typically contains more than 2.5% by weight of K, 0.1–3% by weight of Na, 0–15% by weight of Cl, 0–10% by weight of P, 2–10% by weight of Ca, and 0.5–3% by weight of S in the non combustible inorganic portion of the fuel material.

Kekish (CA 1 202 485) teaches, for coal and bark fired boilers, a broad range for the amount of phosphorous compound to be added relative to the amount of slag, especially slag rich in silicon oxide and calcium oxide. In case of a sufficient homogeneous source of fuel, the operator will be able to determine an appropriate amount of the phosphorous compound on the basis of a few test runs. However, for inhomogeneous fuel sources, this could lead to many troubles and utility shut downs due to variations in the amount and the composition of the non combustible inorganic portion of the fuel material. Addition of too small amounts of phosphorus will cause no beneficial increase in the ash fusion point, and in the worst cases it may even aggravate slag problems. Addition of too large amounts of phosphorus may be costly and in the presence of calcium lead to several low temperature eutectics below 800° C. Also superfluous phosphorus may be liberated as gaseous $(P_2O_5)_2$ or $PO_2$ under combustion conditions and gaseous $(P_2O_3)_2$ under gasification conditions, and contribute to the emission of harmful gasses. Thus the addition of an amount of phosphorous compound which in one situation is beneficial for the slag reduction may turn out to even aggravate the sintering problems in other situations or cause unwanted gas emission problems.

Accordingly it is still a problem to reduce sintering of ash from biomass materials, which by gasification or combustion develop ashes with a fusion point within the above mentioned gasification/combustion temperature range of 700–1000° C. Thus there is a need for an effective additive, as well as a method for the estimation of the necessary amount of such additive, for the gasification and combustion of biomass fuels with greatly varying amount and composition of inorganic compounds. In this way it will be possible to control the agglomeration and sintering problems in case of variations in the composition of the treated biomass material. Even when using the same type of biomass material, such as straw, substantial variations may occur due to different growth and weather conditions, or type of fertilizer used.

It has now been found that the above mentioned agglomeration and sintering problems connected with biomass materials with a high content of potassium and/or sodium can be reduced substantially by the addition of a reactive phosphorous compound, or a combination of reactive phosphorus and reactive calcium in certain forms and amounts, estimated on the basis of a simple analysis of the biomass containing material fed to the gasification or combustion unit.

DESCRIPTION OF THE INVENTION

Accordingly the present invention relates to a method for reducing agglomeration, sintering and deposit formation resulting from the gasification or combustion of a solid carbonaceous fuel material, comprising a combustible portion and a non combustible inorganic portion, which non combustible inorganic portion comprises 4 to 50 parts by weight of $K_w + Na_w$ and 0 to 40 parts by weight of $Si_w$, wherein $K_w$ is potassium, $Na_w$ is sodium, and $Si_w$ is silicon, all calculated in parts by weight of the elements per 100 parts by weight of the inorganic portion, and optionally also chloride, phosphorus, calcium and sulphur which method is characterised in adding to the fuel, before or during the gasification or combustion, $P_{added}$ parts by weight of phosphorous compound, calculated as P, wherein the amount $P_{added}$ is calculated in accordance with the formula I $$P_{added} = q1 \times (31/39\ K_w + 31/23\ Na_w - P_w - 31/35{,}4\ Cl_w) \quad (I)$$

wherein $q1 = 0.33$ to 5, and $P_w$ and $Cl_w$ are the amount of phosphorus and chloride, respectively, present in the fuel material before the addition, calculated in parts by weight of the elements per 100 parts by weight of the inorganic portion, and if necessary $Ca_{added}$ parts by weight of calcium compound, calculated as Ca, wherein the amount $Ca_{added}$ is calculated in accordance with the formula II $$Ca_{added} = q2 \times (40/31 \times (P_{added} + P_w) - Ca_w) \quad (II)$$

wherein $q2 = 0-3$, and $Ca_w$ is the amount of calcium present in the fuel material before the addition.

The addition of phosphorous compounds and, when necessary, calcium compounds will change the composition of the inorganic components of the fuel, whereby the ash resulting from the combustion or gasification of the biomass containing fuel will be dominated by compositions having a fusion point above 1000° C. Examples of such compositions are $KCa(PO_4)$ having a fusion point ($T_m$) of 1560° C., $K_2CaP_2O_7$ with $T_m = 1143°$ C., $K_4Ca(PO_4)_2$ with $T_m = 1645°$ C., $K_4P_2O_7$ with $T_m = 1105°$ C., and $K_3PO_4$ with $T_m = 1340°$ C. An eutectic mixture of around 80% by weight of $KCa(PO_4)$ and 20% by weight of $K_4P_2O_7$ has a fusion temperature of 1045° C.

Without the addition of a phosphorous compound and a calcium compound, the ash from biomass containing fuel will be dominated by lower melting oxides, such as $K_2O \cdot 4SiO_2$, having a melting temperature of 770° C., and $K_2O \cdot SiO_2 \cdot CaO \cdot Na_2O$ in different mixtures with melting temperatures as low as 600° C.

The extent of applicability of the invention appears from the following detailed description. It should, however, be understood that the detailed description and the specific examples are merely included to illustrate the preferred embodiments, and that various alterations and modifications within the scope of protection will be obvious to persons skilled in the art on the basis of the detailed description.

BEST MODE FOR CARRYING OUT THE INVENTION

The inventive method has been developed for the utilisation of energy from straw and other biomass materials such as wood, saw dust, rice husk, and peat all characterised by a relatively high content of potassium and in some cases also sodium. This type of biomass gives a low melting ash, which leads to the above mentioned agglomeration, sintering, deposit and corrosion problems.

Without the addition of a phosphorous compound and, if necessary, a calcium compound in the amounts proposed according to the invention, before or during gasification of a biomass fuel as described above, the ash will contain different salts and oxides having fusion points within a broad range, with a dominating portion of lower temperature melting salts or oxides. In table 1 the melting points are shown for a number of potassium and silicon containing compounds.

TABLE 1

Melting temperatures for potassium and silicon compounds.

| Component | Melting temperature (°C.) |
| --- | --- |
| $SiO_2$ | >1400 |
| $K_2O \cdot 4SiO_2$ | 770 |
| $K_2O \cdot 2SiO_2$ | 1045 |
| $K_2O \cdot SiO_2$ | 976 |
| $K_2O$ | 740 |
| $K_2CO_3$ | 900 |

It is seen from table 1, that even a relatively minor amount of potassium has a significant influence on the melting temperature of a silicon containing ash, that the fusion temperature in the $K_2O$—$SiO_2$ mixtures depends to a large extent on the $K_2O/SiO_2$ ratio, and that melt formation, in this system may take place from around 770° C.

In the above $K_2O/SiO_2$-system, addition of small amounts of reactive calcium, may in some cases reduce the melting point of the ash. Thus $4K_2O \cdot CaO \cdot 10SiO_2$ melts at about 940° C., whereas $K_2O/SiO_2$ in the same relative ratio (4:10), but without CaO present, melts at 995° C. In general, however, addition of sufficient amounts of reactive calcium, will raise the melting point of the product ash. As an example $K_2O \cdot CaO \cdot SiO_2$ melts at 1540° C.

Also salts having a low melting temperature may cause problems during gasification or combustion of biomass. In straw, sodium and potassium may be present in the organic matrix of the fuel or as water soluble salts, e.g. $K_2SO_4$, KCl, NaCl, $K_3PO_4$, $K_2CO_3$, $Na_2CO_3$ or as hydroxides. Such volatile alkali salts may lead to the formation of significant amounts of corrosive molten salt mixtures having melting temperatures even below 600° C. A $K_2CO_3/KCl$ salt phase with melting temperature down to 620° C. is possible.

It is therefore a purpose of the present invention to provide a simple method that will ensure the addition of an additive, in particular phosphorus and calcium, in sufficient amounts, in order to capture the potassium and sodium elements in less harmful compounds.

Additives are compositions added to the process, preferentially in small amounts, in order to improve the gasification or combustion process. The addition of anti agglomeration additives is a way to avoid agglomeration and sintering during the combustion or gasification process. Such additives typically dilute or bind the inorganic catalysts and thus the wanted catalytic effects are also removed. Some additives, however, also have week catalytic effects. Thus the aim is to maintain as much catalytic activity at the necessary temperature, at which complete carbon conversion will take place, and at the same time avoid severe agglomeration and sintering during combustion or gasification.

The addition of one or more phosphorous compounds and, if necessary, calcium compounds to the biomass before or during the gasification or combustion changes the composition of the ash resulting in compounds having a higher fusion point.

A general purpose of the addition of phosphorus is to bind potassium in a phase consisting of $K_2O$—$CaO$—$P_2O_5$, that have melting temperatures above 1000° C., and eventually $K_3PO_4$ that have a melting temperature at 1340° C. These products may have a positive value as a fertilizing product.

A recommended amount of added phosphorus may be calculated from the molar amount of potassium and other elements, in a given amount of the solid carbonaceous fuel material. The ratio of the combustible portion to the non combustible inorganic portion in a solid carbonaceous fuel material may vary within broad limits. For practical reasons the calculations in the present description and claims will therefore be based on parts by weight of the non combustible inorganic portion of the raw fuel material. The raw fuel material is to be understood as the untreated fuel which has not been subjected to any kind of heat treatment (e.g. pyrolysis) in order to change the ratio of combustible to non combustible material. In case the contents of sodium, phosphorus and chloride are negligible the preferred amount of added phosphorus should be one mol P to one mol K.

For practical reasons the amounts of elements contained in the non combustible inorganic portion of fuel material as well as the amounts to be added will be calculated by weight. Accordingly, $E_w$ indicates the amount of the element E in parts by weight of the element per 100 parts by weight of the non combustible inorganic portion of fuel material before addition of additives. In the same way $E_{added}$ indicates the added amount of the element E in parts by weight of the element per 100 parts by weight of the non combustible inorganic portion of fuel material. Thus the preferred addition of one mol P to one mol K mentioned above would read:

$$P_{added}/M_p = K_w/M_K$$

wherein $M_p$ is the atomic weight of P (30.973762≈31) and $M_K$ is the atomic weight of K (39.0983≈39).

From this it follows that:

$$P_{added} = 31/39 \ K_w$$

In practice it is recommended that:

$$P_{added} = q1 \times 31/39 \ K_w$$

wherein q1 is 0.33 to 5, preferably 0.5 to 3, more preferably 0.6 to 2.5, most preferred 0.7 to 1.5, such as about 1.0.

Some biomass fuel already contains a significant amount of phosphorus. In this case the recommended amount of phosphorus to be added will be:

$$P_{added} = q1 \times (31/39 \ K_w - P_w)$$

wherein, according to the above, $P_w$ is the amount of P in % by weight of the inorganic portion of the fuel material before treatment with an additive.

If chloride is present in a significant amount, the major product formed from the chloride present at gasification or combustion conditions is KCl. For straw a typical content of 0.5% by weight of the dry fuel is chloride. At gasification or combustion at temperatures above 850° C. the largest part of the KCl goes to the gaseous phase and leave the bed, and bed agglomeration problems are therefore reduced. This means that one mol K will be removed form the bed ash formed by the gasification for each mol of chloride. The following correction may then be applied reducing the recommended additive amount of phosphorus:

$$P_{added} = q1 \times (31/39 \ K_w - P_w - 31/35.4 \ Cl_w)$$

The effect of sodium is calculated as equivalent to that of potassium. Thus in case sodium is present in the fuel, the recommended added amount of P is as stated in formula I:

$$P_{added} = q1 \times (31/39 \ K_w + 31/23 \ Na_w - P - 31/35.4 \ Cl_w) \tag{I}$$

The maximum needed amounts of moles total phosphorous additive to the process necessary to significantly reduce bed agglomeration and sintering typically equals the sum of the molar contents of the potassium and the earth alkali metals introduced to the reaction zone. In simple cases the maximum amount is equivalent to the molar amounts of alkali and earth alkali metals inherent in the fuel. In several cases half or less of this amount is sufficient. In the specific cases the amount, type and form of other additives or bed material must be considered.

In most cases, when gasification takes place without the presence of abundant other reactive additives or bed materials, which also can react with the added phosphorus, q1=1 will typically give a sufficient amount of phosphorus to be added, in order to prevent agglomeration and sintering. One such other typical additive may be calcium, added to the reactor as calcium carbonate or calcium oxide as a bed material. In case the fuel material contains very little calcium, $K_4P_2O_7$ and $K_3PO_4$ may be the major products. In this case less phosphorus addition is required. In special cases where the ash is very rich in calcium and silicon and low in potassium, sodium, and chloride, very little if any phosphorus is needed, in order to prevent agglomeration and sintering during e.g. fluidised bed gasification. Thus q1 could be as low as 0.33.

When gasification is taking place with addition of both phosphorus and calcium in the form of calcium carbonate, calcium oxide, dolomite or various forms of reactive calcium, significant amounts of $Ca_3(PO_4)_2$ and similar residue products will form, and thus more reactive phosphorous additive may be required than q1=1. A q1 value of 5 could be necessary and still be profitable, since a mixture of reactive calcium and reactive phosphorous will work as a buffer system, and can also be used in fertilizers.

For the $CaKPO_4$—$K_4P_2O_7$ system problems will occur at about the lowest possible melting temperature, which according to a phase diagram for this system appears to be $T_m = 1045°$ C. for 80% by weight of $K_4P_2O_7$. Higher melting temperatures are obtained with a higher Ca to P ratio. Thus production of $CaKPO_4$ ($T_m = 1560°$ C.) in stead of $CaK_2P_2O_7$ ($T_m = 1143°$ C.), and production of $CaKPO_4$ ($T_m = 1560°$ C.) in stead of $K_4P_2O_7$ ($T_m = 1105°$ C.) is desirable. Typical fuels contain a certain amount of calcium, but further addition of reactive calcium in moderate amounts will contribute to a higher melting temperature. According to the inventive method it is considered reasonable to obtain $CaKPO_4$, having a melting temperature of 1560° C., and hence a goal can be to generate this compound as the major product. This means that one mol K requires one mol Ca.

The added calcium should be in the form of active calcium, i.e. calcium in a reactive form. Examples of active calcium sources are dissolved calcium nitrate and dissolved calcium compounds in form of calcium ions $Ca^{++}$, or organically bound calcium. Calcium in compounds like $CaCO_3$, CaO, and $Ca(OH)_2$ is in this respect not very reactive at gasification conditions, but use of such compounds will of course still have an effect, though they should not be counted as calcium in equation II below. Such calcium will, however, to some extent react with phosphorus and therefore higher values for q1 than recommended according to the invention may be necessary.

In order to obtain $KCaPO_4$ as the major product, Ca, P, and K should be present in equal molar amounts, and to obtain $K_2CaP_2O_7$ calcium should only be available in half the amount of the phosphorus.

Thus on a molar basis for $KCaPO_4$:

$$Ca_{total}=P_{total}, \text{ and}$$

for $K_2CaP_2O_7$:

$$Ca_{total}=0.5\ P_{total}$$

where $$Ca_{total}=Ca_{added}+Ca_w, \text{ and}$$

$$P_{total}=P_{added}+P_w$$

Thus on weight basis the amount of added calcium, $Ca_{added}$, can be calculated in accordance with the formula II:

$$Ca_{added}=q2\times(40/31\times(P_{added}+P_w)-Ca_w) \quad (II)$$

wherein q2=0–3, preferably 0.05–1.5, more preferably 0.1–0.8, most preferably 0.4–0.6 such as about 0.5.

The molar ratio, $q2_{added}$, between the added amounts of calcium and phosphate depends on the composition of the additive:

$$Ca_{added}=q2_{added}\times P_{added}$$

For the purpose of the inventive method a molar ratio of $Ca_{added}/P_{added}=1$ is typically not necessary in order to prevent ash agglomeration. In the case where mixtures of $K_2CaP_2O_7$ and $K_4P_2O_7$ are obtained, and some calcium is already present in the fuel, q2<0.5 may be applicable. However, the addition of active calcium increases the reactivity of the fuel and absorbs superfluous phosphorus and provides calcium for $K_xCa_yP_zO_q$ formation.

The consequence of adding more calcium, i.e. q2>1 may be that $Ca_3(PO_4)_2$ is formed in significant amounts, and thus more phosphorus should be added in order to prevent the potassium induced agglomeration and sintering problems, as previously discussed.

The molar amount of inherent calcium in the fuel material is typically smaller than the molar amount of inherent potassium.

According to the invention the phosphorous compound may be any P-containing compound or mixture provided it has no adverse influence on the gasification or combustion. Preferably the phosphorous compound is chosen from the group comprising monocalcium phosphate ($Ca(H_2PO_4)_2\cdot H_2O$), orthophoshoric acid ($H_3PO_4$), hypophosphoric acid ($H_4P_2O_6$), pyrophosphoric acid ($H_4P_2O_7$), hypophosphorus acid ($H_3PO_2$), phosphine ($PH_3$) and oxides of phosphorus. Further examples of usable phosphorus compounds are anhydrous monocalcium phosphate ($Ca_2(H_2PO_4)_2$), calcium hydrogen phosphate ($CaHPO_4$), calcium hydrogen phosphate dihydrate ($CaBPO_4\cdot 2H_2O$), hydroxylapatite ($Ca_5(OH)(PO_4)_3$), calcium pyrophosphate ($Ca_2P_2O_7$), apatite ($Ca_5(PO_4)_3X$), where X is a negative anion, i.e. $Cl^-$ or $\frac{1}{2}CO_3^{2-}$, and phosphate salts including salts of $NH_4$, Ca, Mg, Na, K, Fe, Co and Ni.

Phosphorous containing compounds could also comprise magnesium, since dissolved mixtures of $MgO-P_2O_5-H_2O$ can be derived in the same way as $CaO-H_2O-P_2O_5$. Dissolved salt of magnesium may comprise $Mg_3(PO_4)_2$, $MgHPO_4$, $MgHPO_4\cdot 2H_2O$, $Mg(H_2PO_4)_2$, $Mg(H_2PO_4)_2\cdot 2H_2O$, $Mg(H_2PO_4)_2\cdot 4H_2O$, $MgHPO_4\cdot 3H_2O$ prepared in aqueous solutions with an additional amount of $P_2O_5$, e.g. in the form of an aqueous $H_3PO_4$. The solution may also be prepared from $MgCO_3$ or MgO or $CaMg(CO_3)_2$ or other rocks rich in magnesium.

Especially preferred is addition of orthophosphoric acid ($H_3PO_4$) and pyrophosphoric acid ($H_4P_2O_7$) in combination with inonocalcium phosphate ($Ca(H_2PO_4)_2\cdot H_2O$).

Particular good results have been obtained using monocalcium phosphate ($Ca(H_2PO_4)_2\cdot H_2O$) combined with orthophosphoric acid ($H_3PO_4$) to obtain the molar ratio of Ca/P=1/2.6. This is obtained by 1.6 moles of $Ca(H_2PO_4)_2\cdot H_2O$ combined with 1 mole of $H_3PO_4$ corresponding to 2.0 parts by weight of $Ca(H_2PO_4)_2\cdot H_2O$ to 1 part by weight of $H_3PO_4$.

For use in combustion or gasification, an additive may also be made, either by mixing lime, lime stone, or calcium nitrate, or phosphate rock, or other calcium and phosphorous containing compounds with phosphoric acid or nitric acid or mixtures there off.

The beneficial effect, obtained by the addition of a phosphorus compound according to the invention, may also be obtained by adding smaller amounts of a phosphorous compound than prescribed according to this invention, in case the said phosphorous compound is added together with other additives such as e.g. kaolinite, $CaMg(CO_3)_2$, $Al_2O_3$, $MgCO_3$, MgO, $Mg(OH)_2$, and $TiO_2$. In this case beneficial effects of phosphorus addition may be obtained with addition of up to 10 times less amounts of phosphorus than according to the invention.

The phosphorus and calcium addition may take place in bubbling fluid bed reactors, fixed bed reactors, moving bed reactors, or circulating fluid bed reactors, and the fuel can be any mixture of solid carbonaceous fuels comprising at least 40% by weight of combustible biomass.

A very important feature of the present invention is that all the non combustible inorganic residues generated during the gasification or combustion of the fuel material, with the additions according to the invention, are valuable ingredients of fertilizers.

In the following the invention will be further described by way of non-limiting examples.

EXAMPLES

In test-experiments Lusing a macro-TGA (thermogravimetric analysis) or a bench scale atmospheric fluidised bed (AFB), two different wheat samples, DW95 and DW97, were tested as disclosed in examples 1 and 2 below.

The composition of the two straw samples are given in table 2 and in table 3 the elemental ash composition of the same wheat samples are shown.

TABLE 2

Composition of wheat samples DW95(1) and DW97(2)

| Sample | H$_2$O (% w/w) | Ash (% w/w) | Vol.m (% w/w) | F.C. (% w/w) | C (% w/w) | H (% w/w) | N (% w/w) | S (% w/w) | O (% w/w) |
|---|---|---|---|---|---|---|---|---|---|
| 1 | 7.3 | 5.4 | 77.1 | 17.5 | 46.4 | 5.9 | 0.6 | 0.13 | 41.57 |
| 2 | 7.0 | 6.1 | 75.8 | 18.1 | 46.5 | 5.7 | 1.4 | 0.12 | 40.10 |

Numbers are given as weight % on a dry basis, except for H$_2$O.
Vol.m.: Volatile matter,
F.C.: Fixed carbon.

TABLE 3

Elemental ash composition of wheat samples, DW95 and DW97.

| Sample | Si | Al | Fe | Ca | Mg | K | Na | Ti | S | P | Cl |
|---|---|---|---|---|---|---|---|---|---|---|---|
| (1) % w/w | 14 | 0.10 | 0.17 | 7.4 | 2.5 | 27 | 0.38 | <0.02 | 2.4 | 1.7 | 11 |
| (2) % w/w | 14 | 0.42 | 0.091 | 7.6 | 3.4 | 23 | 1.11 | 0.04 | 2.2 | 4.7 | 4.2 |

Numbers are given as weight % on a dry ash basis.

In order to describe the state of the ash residue a sintering and agglomeration index (SAI) ranging from 0 to 3 was used.

SAI=0: The ash was not sintered, and the structure of the ash resembles the original fuel particles. Ash crumbles easily when touched.

SAI=1: The ash was partly sintered, containing a few fused ash particles.

SAI=2: The ash was partly sintered, containing several small individually fused ash particles.

SAI=3: The ash was totally sintered, and the residue was totally fused into larger blocks.

Example 1

Wheat sample 1 was tested in a macro TGA using different additives and different gasification temperatures.

The results of using H$_3$PO$_4$, as an additive at different temperatures, are shown in table 4 below.

TABLE 4

Sample 1 with or without H$_3$PO$_4$ added
(shown as weight % on a dry fuel basis)
at temperatures ranging from 750–1000° C.

| Additive | weight % | Temperature (° C.) | SAI |
|---|---|---|---|
| H$_3$PO$_4$ | 1.0 | 850 | 1–2 |
| H$_3$PO$_4$ | 1.5–2.0 | 850 | 0 |
| H$_3$PO$_4$ | 1.5 | 900 | 0 |
| H$_3$PO$_4$ | 1.5 | 950 | 0 |
| H$_3$PO$_4$ | 1.5 | 1000 | 0 |
| none | 0 | 750 | 2 |
| none | 0 | 800 | 2–3 |
| none | 0 | 850 | 3 |

In this test example enough water was added for the H$_3$PO$_4$ to be dissolved and evenly distributed on the straw sample. The straw was subsequently dried before the gasification.

The best results were obtained using 1.5–2.0 weight % H$_3$PO$_4$, i.e. q1=0.83–1.1, at temperatures up to 1000° C. The char reactivity decreased with increasing q1 values. The ash residues obtained were soft and non sticking, however, some corrosion occurred on the steel sample holder.

Using 5% by weight of Ca(H$_2$PO$_4$)$_2$·H$_2$O as an additive, i.e. q1=2.14, the same results were obtained with respect to sintering, however, in this case the char reactivity was higher and no significant corrosion of the steel sample holder was observed.

The Ca(H$_2$PO$_4$)$_2$·H$_2$O was dissolved completely in excess water and the straw sample was subsequently dried at 100° C. before the gasification. The ash residues obtained were soft and non sticking.

The major products measured using X-ray diffraction for residues sampled after phosphorus addition as H$_3$PO$_4$ were: KCAPO$_4$+KCl for 1% H$_3$PO$_4$ (q1=0.55), and K$_2$CaP$_2$O$_7$ for 1.5–2.0% H$_3$PO$_4$ (q1=0.83–1.1).

When using 5% Ca(H$_2$PO$_4$)$_2$·H$_2$O (q1=2.14 and q2=0.61) the main products were K$_2$CaP$_2$O$_7$ and Ca$_3$(PO$_4$)$_2$.

Without using any additive sintering was observed already at 750° C.

Example 2

Another straw fuel, wheat 2 (DW97), was tested in a bench-scale atmospheric fluidised bed reactor (AFB), together with various types and amounts of phosphorous additives at 850° C. and 900° C.

A solution of 20 g Ca(H$_2$PO$_4$)$_2$·H$_2$O, 10 g H$_3$PO$_4$, and 200 ml of water per one kg of dry straw sample, was prepared. The solution was allowed to dissolve at 25° C., pH=2. This solution contains 0.0794 moles Ca(H$_2$PO$_4$)$_2$·H$_2$O and 0.1 moles H$_3$PO$_4$ per 200 ml water, i.e. q1=1.16 and q2=0.34. The high amount of water was used in order to assure good mixing of the additive with the straw sample. Also addition of 4% by weight of Ca(H$_2$PO$_4$)$_2$·H$_2$O in dry crushed form was tested. The results are shown in table 5 below.

TABLE 5

Sample 2 with two different additives (shown as moles/kg dry straw) at temperatures ranging from 850–900° C.

| Additive | Moles/kg dry straw | Temperature (° C.) | SAI |
|---|---|---|---|
| $Ca(H_2PO_4)_2 \cdot H_2O$ + $H_3PO_4$ (in 200 ml $H_2O$) | 0.0794 0.1 | 850 | 0 |
| $Ca(H_2PO_4)_2 \cdot H_2O$ + $H_3PO_4$ (in 200 ml $H_2O$) | 0.0794 0.1 | 900 | 0–1 |
| $Ca(H_2PO_4)_2 \cdot H_2O$ (as crushed particles) | 0.1587 | 850 | 1 |
| $Ca(H_2PO_4)_2 \cdot H_2O$ (as crushed particles) | 0.1587 | 900 | 1 |

When $Ca(H_2PO_4)_2 \cdot H_2O$ and $H_3PO_4$ was added to the straw sample in solution the following observations were made:

At 850° C. only a few small agglomerates were observed in the bed. These agglomerates were very loose. Overall sintering and agglomeration was not observed, there was no deposits above the bed (the freeboard), and SAI=0. Also no signs of corrosion.

At 900° C. some agglomerates and deposits were observed in the bed and at the wall just above the bed. No agglomerates were deposited in the reactor freeboard. However, all deposits and agglomerates were very loose and easy to break and remove. Overall SAI=0–1.

When $Ca(H_2PO_4)_2 \cdot H_2O$ was added to the straw sample at 850° C., as crushed dry particles, agglomerates were observed and some of these were large. The agglomerates were very loose and could be easily broken. SAI=1.

The above description of the invention reveals that it is obvious that it can be varied in many ways. Such variations are not to be considered a deviation from the scope of the invention, and all such modifications which are obvious to persons skilled in the art are also to be considered comprised by the scope of the succeeding claims.

What is claimed is:

1. A method for reducing agglomeration, sintering and deposit formation resulting from the gasification or combustion of a solid carbonaceous fuel material comprising a combustible portion and a non combustible inorganic portion, which non combustible inorganic portion comprises 4 to 50 parts by weight of $K_w + Na_w$, and 0 to 40 parts by weight of $Si_w$, wherein $K_w$ is potassium, $Na_w$ is sodium, and $Si_w$ is silicon, all calculated in parts by weight of the elements per 100 parts by weight of the inorganic portion, and optionally also chloride, phosphorus, calcium, and sulphur, characterised in adding to the fuel, before or during the gasification or combustion, $P_{added}$ parts by weight of phosphorus compound calculated as P wherein the amount $P_{added}$ is calculated in accordance with the formula I $$P_{added} = q1 \times (31/39 K_w + 31/23 Na_w - P_w - 31/35,4 Cl_w) \quad (I)$$

wherein q1=0.33 to 5, and $P_w$ and $Cl_w$ are the amount of phosphorus and chloride, respectively, present in the fuel material before the addition, calculated in parts by weight of the elements per 100 parts by weight of the inorganic portion, and if necessary $Ca_{added}$ parts by weight of calcium compound calculated as Ca, wherein the amount $Ca_{added}$ is calculated in accordance with the formula II $$Ca_{added} = q2 \times (40/31 \times (P_{added} + P_w) - Ca_w) \quad (II)$$

wherein q2=0–3, and $Ca_w$ is the amount of calcium present in the fuel material before the addition.

2. The method as claimed in claim 1, characterised in that the solid carbonaceous fuel comprises at least 40% by weight of a biomass material.

3. The method as claimed in claim 2, characterised in that the biomass material comprises straw.

4. The method as claimed in claim 1, characterised in that q1 is 0.5–3.0 and q2=0.05–1.5.

5. The method as claimed in claim 1, characterised in that q1 is 0.6–2.5 and q2=0.1–0.8.

6. The method as claimed in claim 1, characterised in that q1 is 0.7–1.5 and q2=0.4–0.6.

7. The method as claimed in claim 1, characterised in that the phosphorus compound is chosen from the group comprising monocalcium phosphate ($Ca(H_2PO_4)_2 \cdot H_2O$), orthophoshoric acid ($H_3PO_4$), hypophosphoric acid ($H_4P_2O_6$), pyrophosphoric acid ($H_4P_2O_7$), hypophosphorus acid ($H_3PO_2$), phosphine ($PH_3$), oxides of phosphorus, anhydrous monocalcium phosphate ($Ca_2(H_2PO_4)_2$), calcium hydrogen phosphate ($CaHPO_4$), calcium hydrogen phosphate dihydrate ($CaBPO_4 \cdot 2H_2O$), hydroxylapatite ($Ca_5(OH)(PO_4)_3$), calcium pyrophosphate ($Ca_2P_2O_7$), apatite ($Ca_5(PO_4)_3X$), where X is a negative anion, i.e. $Cl^-$ or ½ $CO_3^{2-}$, and phosphate salts.

8. The method as claimed in claim 1, characterised in that the calcium compound is chosen from the group comprising monocalcium phosphate ($Ca(H_2PO_4)_2 \cdot H_2O$), anhydrous monocalcium phosphate ($Ca_2(H_2PO_4)_2$), calcium hydrogen phosphate ($CaHPO_4$), calcium hydrogen phosphate dihydrate ($CaBPO_4 \cdot 2H_2O$), hydroxylapatite ($Ca_5(OH)(PO_4)_3$) and lime.

9. The method as claimed in claim 1, characterised in that the added compounds are orthophoshoric acid ($H_3PO_4$) and pyrophosphoric acid ($H_4O_7P_2$) in combination with monocalcium phosphate ($Ca(H_2PO_4)_2 \cdot H_2O$).

10. The method as claimed in claim 1, characterised in adding a mixture of 2 to 3 parts by weight of $Ca(H_2PO_4)_2 \cdot H_2O$ and one part by weight of $H_3PO_4$.

11. The method as claimed in claim 1, characterised in that the added phosphorous compounds are salts of magnesium comprising $Mg_3(PO_4)_2$, $MgHPO_4$, $MgBPO_4 \cdot 2H_2O$, $Mg(H_2PO_4)_2$, $Mg(H_2PO_4)_2 \cdot 2H_2O$, $Mg(H_2PO_4)_2 \cdot 4H_2O$, $MgHPO_4 \cdot 3H_2O$ prepared in aqueous solutions with an additional amount of $P_2O_5$, e.g. in the form of an aqueous $H_3PO_4$.

12. The method as claimed in claim 1, characterised in that the ash obtained is usable as a fertilizer.

13. The method as claimed in claim 1, characterised in that the phosphorus and calcium addition may take place in bubbling fluid bed reactors, fixed bed reactors, moving bed reactors, or circulating fluid bed reactors.

* * * * *